UNITED STATES PATENT OFFICE.

OTTO THIEL, OF LANDSTUHL, GERMANY, ASSIGNOR, BY MESNE ASSIGNMENTS, TO THE CHEMICAL FOUNDATION, INC., A CORPORATION OF DELAWARE.

PROCESS OF TREATING MOLTEN METAL.

1,353,126.  Specification of Letters Patent.  Patented Sept. 14, 1920.

No Drawing.   Application filed December 28, 1916. Serial No. 139,431.

*To all whom it may concern:*

Be it known that I, OTTO THIEL, engineer, a citizen of the German Empire, residing at Landstuhl, (Rhenish Palatinate,) Germany, have invented certain new and useful Improvements in Processes of Treating Molten Metal, of which the following is a specification.

My invention refers to a process of treating molten metal or metallic alloys with a view to freeing them from the slag formed during the melting process and the particular object of my invention is a simple and efficient method for effecting such separation.

As is well known to those skilled in the art, in all processes referring to the production or treatment of metals and metallic alloys great difficulties are encountered in trying to get rid of the slag formed during such processes. This is the case for instance in most processes for making superior special steel such as nickel steel and the like, but the greatest difficulties are met in the production of ingot iron and steel and of partly decarburized iron in the hearth furnace, such iron or steel to be further subjected to a supplemental treatment in some kind of furnace or other apparatus, more iron being added to the iron contained in the furnace from the beginning.

According to my invention all the difficulties spoken of are avoided and the slag formed is removed by simply adding to the mixture of molten metal and slag within the melting pot, ladle or furnace a quantity of a suitable metal or metallic alloy, either solid or molten, which will suffice to dislodge the slag and to cause it to flow off.

As mentioned above the new process is especially important in the production of steel in the hearth furnace, this process being carried out in two or more phases or periods. For in this process the separation of the slag from the iron has until now offered so many difficulties that during the end or finishing period 15 to 20 per cent. of slag formed during the first part of the decarburization were still present. Thus the pure slag produced by partly decarburizing contains only 70 per cent. of the phosphorus present in the pig iron, about 30 per cent. being found in the end slag (which is nearly valueless) although the partly decarburized metal contains only 0.15–0.3 per cent. phosphorus. Part of the slag resulting from the first part of the decarburization representing something like 1 to 2 marks per ton of steel has to be carried along quite uselessly in the finishing period and is moreover reduced in value. If the percentage of phosphorus is reduced to the metal resulting from the partial decarburization, instead of 0.15–0.3 per cent. phosphorus 0.6–0.7 per cent. are shown. According to my invention I add to the normal decarburizing charge during or after decarburization so much pig iron or some other kind of iron of any suitable composition that the slag present in the furnace is caused to rise until it will flow off. In the tilting furnace the slag will pass through the ordinary outlet, while in a stationary furnace it may flow off through a special duct within the opening serving for returning the partly decarburized metal into the furnace. As the quantity of water flowing off from a filled receptacle will be equal to the quantity flowing in from a permanently running well, the iron charged into the furnace or ladle will completely dislodge the slag and the iron being now left to fill the furnace will, owing to its surface being free of slag, directly absorb an ample amount of heat.

Taking for instance a process producing a yield in the finishing period of 30.35 tons of iron and 4.11 tons of slag, which take up 3.94 plus 1.37=5.31 cubic meters, if the slag is dislodged in the manner described above by means of iron, a quantity of about 40 tons of iron is obtained. During the period of partial decarburization 24.74 tons of iron and 4.66 tons of slag are produced which take up a space of 3.21 plus 1.55=4.76 cubic meters. Consequently the available space admitted a yield of about 28 tons of iron and 5 tons of slag. If to this partly decarburized iron 12 tons of fresh pig iron are added, 5 tons of slag being thus dislodged, a mixed metal containing about 2 per cent. of carbon and 0.6 to 0.7 per cent. of phosphorus is obtained. These 40 tons of metal are then treated as follows.

After tapping the metal free from slag, 24 tons are poured back into the furnace, which does not contain any slag either, and are finished. The rest of 16 tons remains in the ladle until the next period of partial decarburization begins, when they are added in place of pig iron during or after nearly complete dephosphorization. After the slag has been dislodged, the pure metal now contains about 1.7 per cent. of carbon and 0.7 per cent. of phosphorus. It is tapped once more, the 16 tons of iron in excess are added in the next following period of partial decarburization and a mixture containing 0.22 per cent. phosphorus is obtained. In the succeeding charge a partly decarburized metal containing 0.17 per cent phosphorus is obtained, and so on.

It is possible to permanently produce a very pure charge for the finishing period resulting in a far smaller production of slag. The yield will thereby increase, while the single charges take less time. This mode of working offers the special advantage that 100 per cent of the phosphorus in the pig iron and perhaps a small part of the phosphorus in the ore is obtained in the form of high grade Thomas slag.

If greater importance is attached to as high a production as possible rather than to a full yield of Thomas slag, one may conduct the process in such a manner that the 40 tons of the partial decarburization period are distributed over two finishing periods, a full period of partial decarburization being thus saved. This is equal to an increase in production of 20 to 25 per cent., the expenses of production not being increased in the least. The second half of the metal from the partly decarburizing period is kept in covered ladles of any suitable construction until the end of the first finishing period. As is well known, fluid iron may be kept hot in this manner for four hours and even longer. It is preferable, of course, to utilize the second half directly in another furnace.

It would equally be feasible to conduct the process in such a way that one furnace only is used for partial decarburization, while two furnaces are used for finishing. In each furnace 6 charges are treated, that means 12 charges in the finishing furnaces.

It is quite feasible of course to modify the process described according to the needs in each case. By replacing the slag by iron the partly decarburized iron and the slag have also been purified to a certain extent. The partly decarburized metal which will in many cases react vigorously, on passing into the ladle, does not show such reaction any more. The slag is freed from the grains of iron which it is often strongly interspersed with. As during the pouring in of the pig iron and the flowing off of the slag chemical processes are still taking place, the slag gets very poor in iron and very rich in phosphoric acid. Therefore, if a suitable amount of ore is added, the percentage of phosphorus in the partly decarburized metal will not exceed 0.5 per cent. In the case of a pig iron having a smaller percentage of phosphorus the partly decarburized metal in excess may be added first during the decarburizing period next following and the pig iron may be added afterward.

The process described is especially suited for producing partly decarburized metal of any composition for all purposes.

Special advantages are obtained if the partly decarburized metal is treated further in the converter. Owing to the high initial temperature and to the fact that the greater part of the impurities has already been removed, the time of treatment of the charge will be exceedingly short. In the basic converter great economic advantages over the ordinary Thomas process are obtained by a far reaching utilization of the phosphorus contained in the pig iron under the form of Thomas slag and by a very high yield. A furnace having a capacity of 100 tons can, by aid of the present process, be made to produce about 1000 tons of partly decarburized iron.

I claim :—

1. The herein described process of treating molten metal and slag to remove the slag which consists in adding to the molten metal a quantity of unmelted metal of a similar kind to cause the slag to flow away from the surface of the molten metal in quantity corresponding to the quantity of unmelted metal added.

2. The herein described process of treating molten metal and slag which consists in adding to a decarburized charge thereof an additional supply of unmelted metal of a similar kind and of amount sufficient to cause the slag to flow off from the molten mass in quantity equal to the amount of unmelted metal added.

In testimony whereof I have hereunto set my hand.

OTTO THIEL.